United States Patent [19]

McLeod

[11] 4,332,636
[45] Jun. 1, 1982

[54] METHOD OF BONDING AN OPTICAL ELEMENT TO A SUPPORT

[75] Inventor: John McLeod, Edinburgh, Scotland

[73] Assignee: Ferranti Limited, Cheadle, England

[21] Appl. No.: 140,011

[22] Filed: Apr. 14, 1980

[30] Foreign Application Priority Data

May 3, 1979 [GB] United Kingdom ............... 7915506

[51] Int. Cl.³ ..................... B32B 31/24; B32B 7/14
[52] U.S. Cl. .................. 156/289; 51/216 LP; 156/107; 156/291; 428/38; 428/138; 428/194; 428/429
[58] Field of Search ............. 51/216 LP, 240 GB; 156/107, 289, 291; 428/34, 38, 138, 194, 429

[56] References Cited

U.S. PATENT DOCUMENTS 3,061,490 10/1962 Ryan .............................. 156/107 X
3,453,783 7/1969 Queen ............................ 51/216 LP
3,460,303 8/1969 Algrain et al. .................. 428/38 X Primary Examiner—Robert A. Dawson
Attorney, Agent, or Firm—Kerkam, Stowell, Kondracki & Clarke

[57] ABSTRACT

A method of bonding an optical element (12) to a support (10) requires the formation on the support of a thin pad (11) of material of substantially the same dimensions as the base of the optical element. The material of the pad is one to which the adhesive to be used will not adhere. The optical element (12) is positioned on the pad (11) and a fillet of the adhesive (13) is applied around the base of the element, in contact with both the base of the element and with the support. As a modification, an aperture (14) may be formed in the pad (11) and filled with a rapid-setting adhesive (15) to secure the element in position while the fillet of adhesive is applied.

6 Claims, 5 Drawing Figures

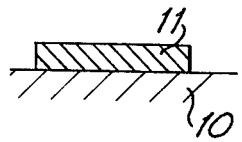
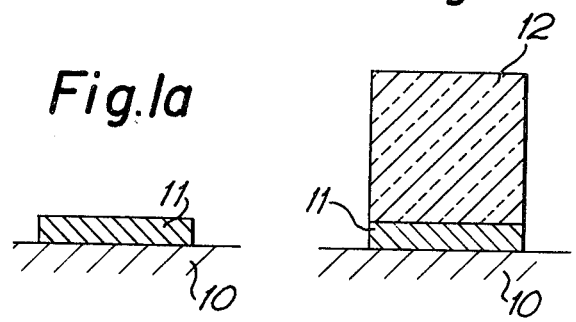
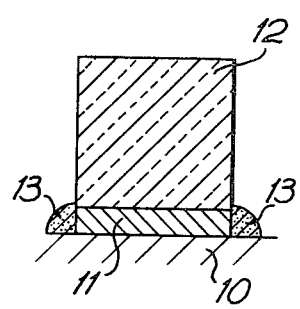
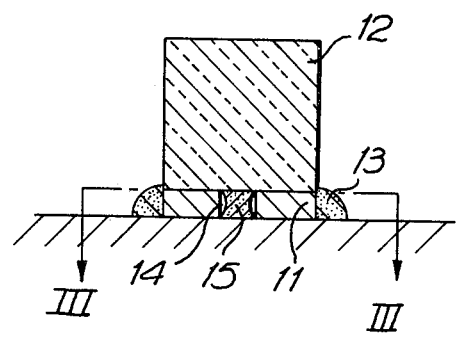
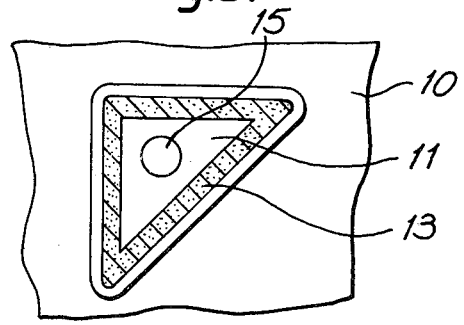

METHOD OF BONDING AN OPTICAL ELEMENT TO A SUPPORT

This invention relates to a method of bonding an optical element to a support. In many items of optical apparatus it is necessary to secure optical elements to a support, for example to provide rigidity. The nature or size of the optical elements may make it advisable to use fastening devices such as clamps or straps. However, when the optical elements are small and light, simpler methods may be used, the simplest being the use of an adhesive. Unfortunately when using an adhesive to secure an optical element to a support it is often found that strains are introduced into the optical elements which interfere with their operation. In applications involving the use of polarised light, for example, it is essential that no strain is introduced as this will itself cause polarisation effects.

Strain may be introduced into an optical element by an adhesive in two ways, one of which is by shrinkage or expansion of a layer of adhesive between the optical element and the support as the adhesive sets or cures. Even if the adhesive is one in which dimensional changes do not occur as it sets, changes in temperature may cause strain due to the differential expansion of the adhesive and the optical element.

The problem of differential expansion could be avoided by using a flexible adhesive, but in some applications this would not provide the mechanical strength necessary to maintain correct alignment.

It is an object of the invention to provide a method of bonding an optical element to a support which results in little or no strain being introduced into the optical element.

According to the present invention there is provided a method of bonding an optical element to a support which includes the steps of forming on the support a thin pad having substantially the same external dimensions as the base of the optical element and made from a material to which a suitable adhesive will not adhere, positioning the optical element on the pad in the desired orientation, applying a fillet of the suitable adhesive around the base of the optical element such that the adhesive is in contact with both the optical element and the support, and allowing the adhesive to set.

The invention will now be described with reference to the accompanying drawings, in which:

FIG. 1 shows a series of sectional side views illustrating the steps according to one embodiment of the invention;

FIG. 2 is a sectional side view of an optical element bonded in accordance with a second embodiment; and FIG. 3 is a sectional plan view along the line III—III of FIG. 2.

Referring now to FIG. 1, this illustrates three of the four basic steps of the bonding method. FIG. 1(a) shows a support 10, probably of metal, on which is formed a pad 11 of a suitable material to which the adhesive to be used will not adhere. This pad is of substantially the same dimensions in plan as the base of the optical element. If the adhesive to be used is, for example, an epoxy resin adhesive, then the pad may be made from a material such as a silicone rubber or p.t.f.e. If other adhesives are to be used then the pad may have to be made from other materials. FIG. 1(b) illustrates the next step of the method, in which the optical element 12 is placed on the pad 11 in the desired position. It may be necessary at this stage to hold the optical element in some form of jig if a particular alignment is to be accurately maintained. In this case a pad of resilient material will allow adjustment of the optical element whilst maintaining its base in contact with the pad. As shown in FIG. 1(c), the next step of the method is to apply a fillet 13 of the adhesive around the base of the optical element so that the adhesive is in contact with both the optical element 12 and the support 10. Since the base of the optical element 12 is in contact with the pad 11, it is unlikely that any adhesive will seep between them. However, if this does happen, the adhesive will not adhere to the pad and hence the strain problems due to a thin layer of adhesive will be avoided. Finally, the adhesive fillet 13 is allowed to set, securing the optical element 12 firmly in position. Bonding between the optical element 12 and the support 10 occurs only at the edges of the base of the element, and there is little risk of introducing any significant strain.

It is not necessary for the pad 11 to be solid, and it may be formed with at least one aperture extending through it. In the extreme case, there may be a single large aperture so that the pad consists of a strip of material on which the edges of the base of the optical element are mounted.

One of the disadvantages of the method described above is that it is necessary to ensure that the optical element is not moved whilst the adhesive is setting. This may take a considerable time during which it may not be possible to bond another optical element to the same support. Alternatively, if a jig is used to locate the optical element, then the jig cannot be used for anything else until the adhesive has set.

FIGS. 2 and 3 show an optical element, in the form of a prism 12, which has been secured to a support by a method which is a modification of that already described. In using the modified method it is necessary to form a pad 11 which has an aperture 14 formed in it, preferably in the centre of the pad. The aperture need not be large. After the pad has been formed, the aperture 14 is filled with an adhesive and the optical element 12 is positioned on the pad 12 and correctly aligned. The small column of adhesive is then allowed to set, so that the optical element is held in position by a thin pillar of adhesive 15. The adhesive is again one which does not adhere to the material of the pad 11. It is possible to use either a rapid-setting adhesive in the aperture 14, or an adhesive which may be caused to set by some form of radiation, such as ultra-violet radiation. This enables the optical element to be secured in the correct position rapidly, thus avoiding the delays referred to above. The fillet of adhesive 13 is then applied to provide the necessary mechanically strong bond between the optical element and the support.

The pillar of adhesive 15 is in contact with the optical element 12 over a very small area, and there is little risk of any strain being introduced by it.

The bonding method described above is obviously particularly suitable for use with apparatus involving small optical elements.

What we claim is:

1. A method of bonding an optical element to a support which includes the steps of forming on the support a thin pad having substantially the same external dimensions as the base of the optical element of a material to which a suitable adhesive will not adhere, positioning the optical element on the pad in the desired orientation, applying a fillet of the suitable adhesive around the base of the optical element such that the adhesive is in contact with both the optical element and the support, and allowing the adhesive to set and to secure the optical element rigidly to the support.

2. A method as claimed in claim 1 in which the pad is formed from a resilient material.

3. A method as claimed in claim 2 in which the resilient material is a silicone rubber material.

4. A method as claimed in claim 1 in which the pad contains at least one aperture extending between the support and the base of the optical element.

5. A method as claimed in claim 4 which includes the steps of placing a small quantity of adhesive in an aperture in the pad prior to the positioning of the optical element on the pad, and allowing that adhesive to set prior to applying the fillet of adhesive around the base of the optical element.

6. A method as claimed in claim 5 in which the adhesive placed in the aperture is a rapid-setting adhesive.

* * * * *